Figure 1:
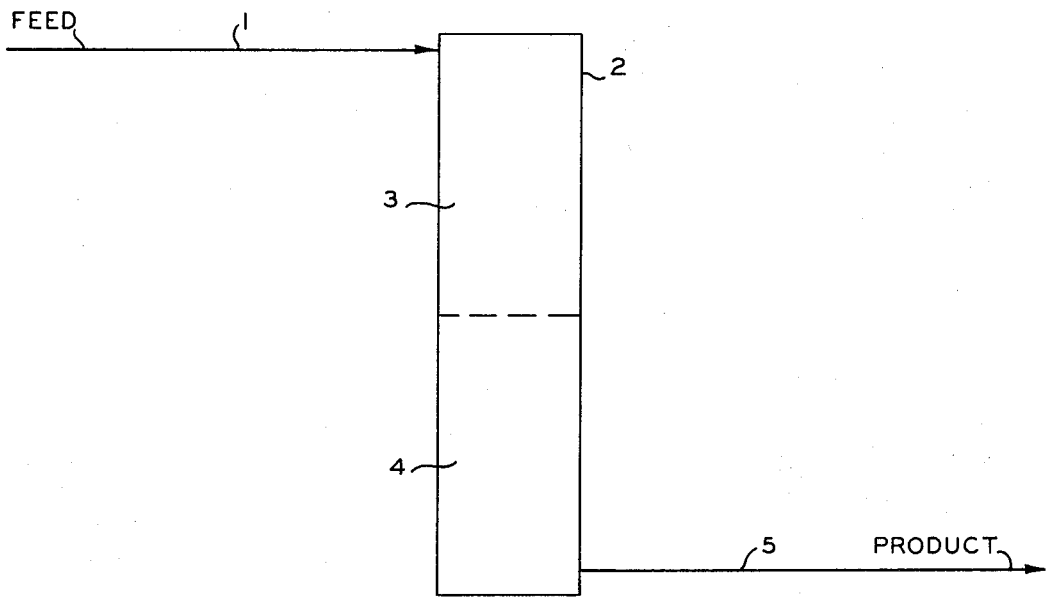

United States Patent
Pitzer

[15] 3,686,346
[45] Aug. 22, 1972

[54] CATALYTIC DEHYDROGENATION
[72] Inventor: Emory W. Pitzer, Bartlesville, Okla.
[73] Assignee: Phillips Petroleum Company
[22] Filed: March 5, 1970
[21] Appl. No.: 16,906

[52] U.S. Cl. ............260/680 E, 252/437, 260/669 R
[51] Int. Cl. ..............................................C07c 5/18
[58] Field of Search .................................260/680 E

[56] References Cited

UNITED STATES PATENTS

| | | | |
|---|---|---|---|
| 3,320,329 | 5/1967 | Nolan | 260/680 |
| 3,501,547 | 3/1970 | Nolan et al. | 260/680 |
| 3,501,548 | 3/1970 | Nolan et al. | 260/680 |
| 3,513,215 | 5/1970 | Ogle | 260/680 |
| 3,557,238 | 1/1971 | Cunningham | 260/680 |
| 3,456,004 | 7/1969 | Eden | 252/437 X |

*Primary Examiner*—Paul M. Coughlan, Jr.
*Attorney*—Young and Quigg

[57] ABSTRACT

In a dehydrogenation process, the feed stream is successively and continuously passed through at least two Sn/O/O catalyst beds wherein the first catalyst bed is essentially free of Group Ia and IIa metals and the remaining catalyst beds contain a substantial amount of Group Ia or IIa metal-containing materials. The reaction temperature is gradually increased as the amount of Group Ia or IIa metal is increased.

11 Claims, 2 Drawing Figures

INVENTOR.
E. W. PITZER

BY Young & Quigg

ATTORNEYS

CATALYTIC DEHYDROGENATION

This invention relates to an improved dehydrogenation process. In another aspect, it relates to a catalytic converter suitable for use in a dehydrogenation process.

If a fixed bed reactor is used in the dehydrogenation of olefins, it is desirable to control the temperature of the catalyst bed so as to avoid over-heating which promotes undesirable side reactions. In an oxidative conversion reaction, higher temperatures are found at the downstream end of the catalyst bed due to the exothermic nature of the reaction. Previously, the problem has been controlled by maintaining the upstream temperature at some lower level. The resulting temperature range in the catalyst bed imposes problems for the catalyst, e.g., it must have activity at low temperature without having excessive activity (and low selectivity) at high temperatures.

It now has been found that improved results can be obtained in a dehydrogenation process by passing the feed stream successively and continuously through at least two Sn/P/O catalyst beds wherein the first catalyst bed is essentially free of Group Ia and IIa metals and the remaining catalyst beds contain 0.1 to 10 weight percent of a Group Ia or IIa metal based on the total weight of the final catalyst. It has been found that Sn/P/O catalysts combined with Group Ia or IIa metal-containing materials yield particularly good results at higher temperatures.

Accordingly, it is an object of this invention to provide an improved dehydrogenation process.

Another object is to provide an improved catalytic converter for such a process.

Other objects, aspects and advantages of this invention will become apparent to one skilled in the art upon consideration of this disclosure, the accompanying drawings, and appended claims.

The oxidative dehydrogenation catalysts which are applicable for use in the present invention are tin, phosphorus, and oxygen-containing catalysts such as those disclosed in co-pending U.S. application Ser. No. 810,831 filed on Mar. 26, 1969 and now abandoned. Such catalysts contain from about 0.1 to about 16 weight percent phosphorus, from about 15 to about 75 weight percent tin, and from about 0.0 to about 10 weight percent of a Group IA or IIA metal is lithium although sodium, potassium, barium, calcium, and the like, can also be used.

Such catalysts are conventionally prepared. In general, they are prepared from any phosphorus compounds, tin compounds, and alkali or alkaline earth metal compounds (hereinafter referred to simply as lithium), so long as none of the compounds are deleterious to catalytic dehydrogenation, and so long as substantially all the elements in the catalyst preparation materials used, other than phosphorus, tin, oxygen, and lithium (when used), are volatilized by calcination of the catalyst composite at about 1,000° F or washed out of the composition at a suitable stage in its preparation.

The preferred catalysts are conveniently prepared by co-precipitating the desired phosphorus and tin compounds, aging the wet precipitate, washing the wet hydrogel precipitate, spray-drying the precipitate, calcining the resulting powder, converting the powder into tablets, calcining the tablets, impregnating the tablets with a lithium compound (when used), and calcining the impregnated tablet to provide the finished catalyst.

In the operation of the present invention, reaction mixtures are passed consecutively through a reaction zone containing two or more catalytic beds, each bed containing a tin/phosphorus/oxygen catalyst (hereinafter referred to simply as tin oxide-tin phosphate catalyst) active for dehydrogenation. The catalysts in the beds are arranged such that the feed stream first contacts a catalyst which is essentially free of lithium. Next, the feed stream, before it leaves the reaction zone, contacts a tin oxide-tin phosphate catalyst which contains a substantial amount of lithium. If desired, one or more other catalyst beds can be interposed between the lithium-free and lithium-containing catalyst beds such that the feedstock will contact, sequentially, a dehydrogenation catalyst bed free of lithium, one or more dehydrogenation catalyst beds in which the lithium content is gradually increased and, finally a catalyst bed containing substantial lithium. The average temperature of the feedstock, as it passes through the total length of the reaction zone, is gradually increased.

Figure 2:
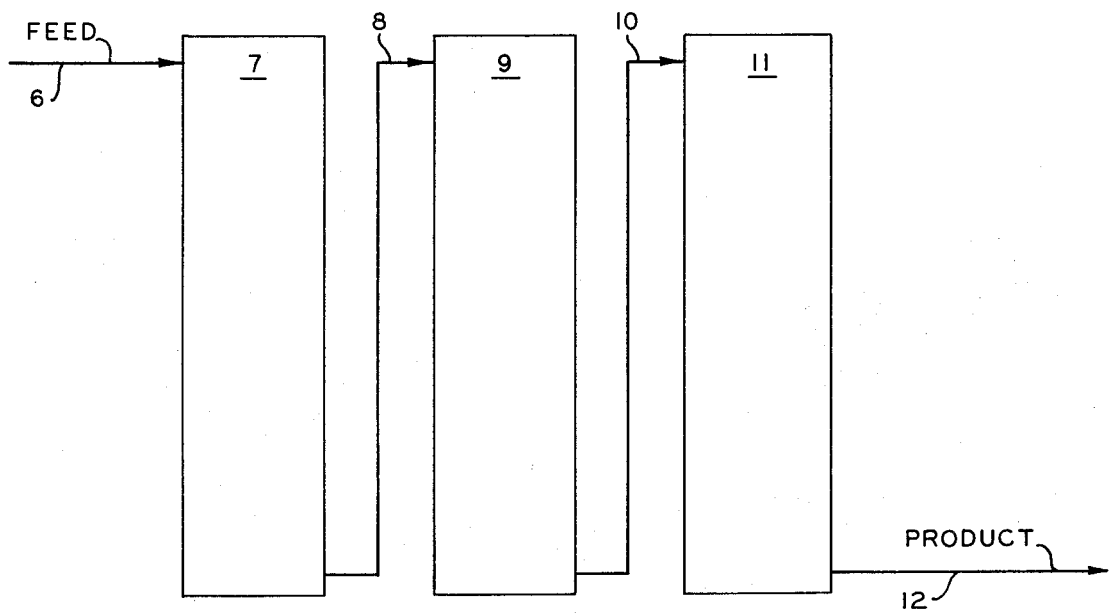

Such multiple dehydrogenation catalyst beds can be arranged as consecutive beds within a single catalytic reactor as illustrated in FIG. 1, or, if desired, the multiple beds can utilize two or more individual catalytic reactors arranged in sequence and each containing a different dehydrogenation catalyst bed as illustrated in FIG. 2. Up to about six such different catalyst beds, for example, can be used with advantage in the process of the present invention.

FIG. 1 is a vertical view of a graded series of catalyst beds within a single reactor. Referring now to FIG. 1, the feed stream passes through pipe 1 into contact with a suitable catalyst in catalytic converter 2. The first half of catalytic converter 2 (zone 3) consists of a bed of lithium-free catalyst while the second half of catalytic converter 2 (zone 4) consists of a bed of catalyst containing 3 per cent lithium. The feed stream first contacts the catalyst of zone 3 then contacts the catalyst of zone 4. The inlet temperature to zone 3 is 850° F and the outlet temperature of zone 4 is 1,050° F. The reaction mixture is then withdrawn through outlet 5 after which it can be quenched and subjected to separation operations by any suitable method. It is to be understood that the catalytic converter 2 can have at least two zones, as illustrated, or as many as six zones in which the first zone contains no lithium and the last five zones gradually increase in the amount of lithium employed.

FIG. 2 is a vertical view of utilizing two or more individual catalytic converters. The feed stream passes through pipe 6 to the first catalytic converter 7 which contains a catalyst with no lithium present. The inlet temperature in catalytic converter 7 ranges from 700° to 1,000° F. The reaction mixture is then drawn through outlet 8 and passed into catalytic converter 9 which contains a catalyst having a substantial amount of lithium. The reaction mixture is then drawn from catalytic converter 9 through outlet 10 and passed into catalytic converter 11 which contains a catalyst containing a greater amount of lithium than the catalyst in catalytic converter 9. The outlet temperature of catalytic converter 11 ranges from 900° to 1,300° F, but the average temperature of catalytic converter 11 preferably is higher than the average temperature of catalytic converter 9. The reaction mixture of catalytic converter 11 is then moved through outlet 12. It is to be understood that at least two individual catalytic converters can be employed, preferably up to six individual catalytic converters can be employed in this embodiment of the invention.

Also, it is to be understood that the catalytic converter or converters can be elongated chambers or large-diameter, shallow-bed chambers.

In a preferred mode of operation, a graded series of catalyst beds within a single reactor is used, with no lithium present up to a point in the reaction zone where the reaction temperature reaches about 950° F, and with lithium increasing in increments to a maximum of about 3 weight percent lithium as the temperature gradually increases to that at the reactor outlet, for example about 1,050° F.

Because of the highly exothermic nature of the dehydrogenation reaction, there is an unavoidable increase in reaction zone temperature from the temperature of the pre-heated reaction mixture at the inlet of the reaction zone to the temperature of the mixture at the outlet of the reaction zone. Further, it has been discovered that tin oxide-tin phosphate dehydrogenation catalysts significantly vary in their effectiveness according to reaction zone temperature and according to lithium content. Catalysts with relatively high lithium content are much more effective at the relative high temperatures near the outlet of the reaction zone. Thus, the present invention takes advantage of the range of reaction zone temperatures within a catalytic dehydrogenation reactor and, by varying the catalyst composition within the reaction zone, provides a total reaction zone which is capable of dehydrogenating a given feed with high conversion and with high selectivity.

The improved arrangement of catalysts of the present invention are utilized advantageously in oxidative dehydrogenation processes described in the aforementioned U.S. application. For example, dehydrogenatable feeds such as alkenes, cycloalkenes, alkylpyridines, and alkylaromatics are effectively converted.

Some specific examples of suitable dehydrogenatable feeds are 1-butene, 2-butene, 2-pentene, 2-methylpentene-2, octenes, decenes, cyclopentene, cyclohexene, ethylbenzene, ethylpyridine, and the like, and mixtures thereof. The invention process is particularly effective for the dehydrogenation of butenes to butadiene.

Within the catalytic zone containing the invention sequence of catalysts, the catalysts can be used in any conventional form such as granules, extrudates, pellets, spheres, or any other mechanically formed shapes which are convenient. The catalysts can also be employed with suitable supporting or diluting materials such as alumina (preferably beta or gamma alumina) or materials such as boria, magnesia titania, and other similar materials known in the art.

The dehydrogenatable feed is contacted with the catalysts in the improved catalyst zone arrangement at 0.05–250 psia, at an oxygen to dehydrogenatable feed volume ratio of 0.1:1 to about 3:1, at a steam-to-feed ratio of 0.1:1 to 100:1, and at a gaseous hourly space velocity (GHSV) of 50–5,000 v/v/hour. The pre-heated feed mixture will contact the catalyst at the inlet of the catalytic zone at a temperature in the range of from about 700°to about 1,000° F, preferably 800°–900° F. The reaction mixture will exit the final catalytic zone at a temperature in the range of from about 900° to about 1,300° F, preferably 1,000°–1,100° F. The differential between the temperature of the reaction mixture at the inlet of the catalytic zone and the temperature at the outlet will be at least 150° F.

The advantages of this invention are further illustrated by the following examples. The reactants and proportions and other specific conditions are presented as being typical and should not be construed to limit the invention unduly.

EXAMPLE I

The advantages and unexpected nature of the present invention are illustrated by consideration of four control runs which are presented here for comparison and background purposes. In these runs butene-2 was oxidatively dehydrogenated to butadiene by passage through a tubular fixed catalyst bed reactor at atmospheric pressure, at a gaseous hourly space velocity (GHSV) of 300 volumes of butene feed per volume of catalyst bed per hour, at a steam ratio of 15–18 volumes of steam per volume of hydrocarbon feed, at an air ratio of 4 volumes of air per volume of hydrocarbon feed, at an air ratio of 4 volumes of air per volume of hydrocarbon feed, at selected inlet and outlet reactor temperatures such that the differential between the inlet and outlet temperatures was relatively narrow.

The catalysts used in these runs were of two types; one catalyst consisted of 1/16-inch granules of a tin oxide-tin phosphate catalyst containing 10 weight percent phosphorus, the balance being tin oxide and phosphorus-combined oxygen, and with no significant lithium content. Surface area of the catalyst was about 23 m²/g; the second catalyst used in this series was identical to the first except it was modified by impregnation with sufficient lithium nitrate such that it contained 3 weight percent lithium based upon the weight of the original catalyst. Both catalysts were conventionally dried and activated by calcination at elevated temperatures in flowing air.

The essential data and the result of these four comparison runs are shown in Table I below:

Table I

| Run | Catalyst | Temp.°F Inlet | Outlet | Yield %[1] | Modivity[2] |
|-----|----------|---------------|--------|------------|-------------|
| 1   | 0.0% Li  | 850           | 950    | 39         | 93          |
| 2   | 0.0% Li  | 950           | 1050   | 50         | 92          |
| 3   | 3.0% Li  | 850           | 950    | 39         | 85          |
| 4   | 3.0% Li  | 950           | 1050   | 75         | 98          |

(1) Percentage of feed converted to butadiene in a single pass
(2) A modified selectivity to butadiene; selectivity based on analysis of gas phase products only, neglecting any solid or liquid phase products for convenience; it is a close approximation of selectivity.

Comparing Run 1 with Run 3 shows that the non-lithium catalyst is more effective at this relatively low operating temperature range, resulting in a higher modivity (modified selectivity). Conversely, comparing Runs 2 and 4 show that the lithium-containing catalyst is much more effective at the relatively high range of operating temperatures, resulting in both higher yield and higher modivity. It is, however, not ordinarily practical on a commercial scale to control the temperature of such a highly exothermic reaction within the narrow limits such as those shown in Table I. Thus, a process using but a single catalyst must necessarily tolerate a compromise and not achieve the most effective results possible.

EXAMPLE II

The invention is illustrated by the following run which is carried out using the same catalysts, the same reactor, and the same operating conditions as those of Example I except that the inlet and outlet temperatures of the reaction zone are more realistic and typical of commercial operation, and except that the catalyst zone consists of two beds each consisting of one of the two different catalysts. The first half of the catalytic zone consists of a bed of lithium-free catalyst while the second half of the reaction zone consists of a bed of catalyst containing 3 percent lithium. The butene-containing feed stream first contacts the lithium-free catalyst at the relatively low temperatures and then contacts the lithium-containing catalysts at the relatively high temperatures.

For purposes of comparison, two other runs are shown in which the catalytic zone contains catalysts of one type only. Except for this, the comparison runs are identical to that of the invention run.

The essential data and results of these runs are shown in Table II below:

TABLE II

| Catalyst Run | Sect. 1 | Sect. 2 | Temp.°F In | Out | Yield, % | Modivity, % |
|---|---|---|---|---|---|---|
| 5 | 0% Li | 3% Li | 850 | 1050 | 57 | 96 |
| 6 | 9 0% Li | 0% Li | 850 | 1050 | 45 | 93 |
| 7 | 3% Li | 3% Li | 850 | 1050 | 57 | 91 |

Comparing invention Run 5 with non-invention Runs 6 and 7 clearly shows the improved results obtainable using the sequential catalyst bed arrangement of the present invention. Not only is a high yield maintained, but the inventive run also results in an increase in modivity which is greater than either of the control runs.

Although this invention has been described in considerable detail, it must be understood that such detail is for the purposes of illustration only and that many variations and modifications can be made by one skilled in the art without departing from the scope and spirit thereof.

I claim:

1. In a dehydrogenation process which employs a tin-phosphorus-oxygen based catalyst, the improvement comprising passing a feed stream successively and continuously through at least two catalyst beds wherein the first of said catalyst beds is essentially free of Group Ia metals, catalyst beds other than and successive to said first catalyst bed contain tin-phosphorus-oxygen based catalyst further containing 0.1 to 10 weight percent of Group Ia metal based on the total weight of the catalyst composition, and wherein in said process the outlet temperature of the last catalyst bed is substantially higher than the inlet temperature of the first catalyst bed.

2. A process according to claim 1 wherein each said catalyst in each said catalyst bed is prepared from at least one phosphorus-containing material and at least one tin-containing material, and each said catalyst in each said catalyst bed other than that said first catalyst bed further is prepared from a Group Ia metal or metal containing material, none of said materials are deleterious to dehydrogenation catalytic effects, and all of the elements in said materials other than phosphorus, tin, oxygen, and Group Ia metal have been volatilized by heating each said catalyst at least to the temperature at which said catalyst is used in said dehydrogenation process or removed from said catalyst by washing with a liquid that is non-deleterious to the catalytic effects of said catalyst.

3. A process according to claim 1 wherein three to six catalyst beds are employed, and the amount of said Group Ia metal in each successive catalyst bed after the first catalyst bed gradually increases from a minimum of 0.1 to a maximum of 10 weight percent of said Group Ia metal based on the total weight of each respective catalyst.

4. A process according to claim 3 wherein the amount of said Group Ia metal in each such successive catalyst bed gradually increases to a maximum of about 3 weight percent in the last said catalyst bed.

5. A process according to claim 1 wherein said dehydrogenation process is carried out at an inlet temperature in the first catalyst bed in the range of 700° to 1,000° F and at an outlet temperature in the last catalyst bed in the range of 900° to 1,300° F.

6. A process according to claim 5 wherein said inlet temperature is in the range of 800° to 900° F and said outlet temperature is in the range of 1,000° to 1,100° F.

7. A process according to claim 1 wherein said dehydrogenation process is carried out at a pressure in the range of 0.05 to 250 psia, an oxygen-to-dehydrogenatable feed volume ratio of 0.1:1 to 3:1, at a steam-to-feed ratio of 0.1:1 to 100:1 and at a gaseous hourly space velocity of 50 to 5,000 v/v/hour.

8. A process according to claim 2 wherein said phosphorus-containing materials are employed in amounts sufficient to provide the final catalyst with from 0.1 to 16 weight percent phosphorus, and said tin-containing materials are employed in an amount sufficient to provide the final catalyst from 15 to 75 weight percent tin, each based on the total weight of the final catalyst.

9. A process according to claim 8 wherein said phosphorus-containing material is phosphoric acid, phosphorus pentoxide, or tin phosphate; said tin-containing material is stannic chloride, stannic sulfate, stannous sulfate, stannic oxide, or said tin phosphate; and said Group Ia metal-containing material is lithium chloride or lithium nitrate.

10. A process according to claim 9 wherein 1,3-butadiene is formed from butene in said feed stream, said phosphorus-containing material is tin phosphate, said tin-containing material is stannic oxide and said Group Ia metal-containing material is lithium nitrate.

11. A process according to claim 8 wherein said Group Ia containing material is a lithium containing material such that the Group Ia metal is lithium.

* * * * *